(12) United States Patent
Ginley et al.

(10) Patent No.: US 9,409,111 B2
(45) Date of Patent: Aug. 9, 2016

(54) POROUS BLOCK NANOFIBER COMPOSITE FILTERS

(75) Inventors: David S. Ginley, Golden, CO (US);
Calvin J. Curtis, Golden, CO (US);
Alexander Miedaner, Golden, CO (US);
Alan J. Weiss, Dallas, TX (US); Arnold Paddock, Dallas, TX (US)

(73) Assignees: Global Water Group, Incorporated, Dallas, TX (US); Alliance For Sustainable Energy, LLC, Golden, CO (US)

( * ) Notice: Subject to any disclaimer, the term of this patent is extended or adjusted under 35 U.S.C. 154(b) by 297 days.

(21) Appl. No.: 13/130,109

(22) PCT Filed: Nov. 21, 2008

(86) PCT No.: PCT/US2008/084434
§ 371 (c)(1),
(2), (4) Date: Oct. 6, 2011

(87) PCT Pub. No.: WO2010/059165
PCT Pub. Date: May 27, 2010

(65) Prior Publication Data
US 2012/0037560 A1 Feb. 16, 2012

(51) Int. Cl.
*B01J 20/06* (2006.01)
*B01J 20/08* (2006.01)
(Continued)

(52) U.S. Cl.
CPC ............ *B01D 39/1676* (2013.01); *B01D 39/18* (2013.01); *B01D 39/2062* (2013.01); *B01D 39/2082* (2013.01); *B01J 20/06* (2013.01); *B01J 20/08* (2013.01); *B01J 20/28007* (2013.01); *B01J 20/28042* (2013.01); *B01J 20/28061* (2013.01); *B01J 20/3204* (2013.01); *B01J 20/3206* (2013.01); *B01J 20/3236* (2013.01); *B82Y 30/00* (2013.01); *B01D 2239/025* (2013.01); *B01D 2239/0407* (2013.01); *B01D 2239/0442* (2013.01); *B01D 2239/064* (2013.01); *B01D 2239/10* (2013.01);
(Continued)

(58) Field of Classification Search
None
See application file for complete search history.

(56) References Cited

U.S. PATENT DOCUMENTS

| | | | |
|---|---|---|---|
| 2003/0127393 A1* | 7/2003 | Tepper | A61L 2/0017 210/656 |
| 2005/0029198 A1 | 2/2005 | Tepper | |
| 2005/0279696 A1* | 12/2005 | Bahm | B01D 39/04 210/446 |

FOREIGN PATENT DOCUMENTS

| | | |
|---|---|---|
| GB | 2 404 347 A | 2/2005 |
| JP | 02-149307 A | 6/1990 |

(Continued)

OTHER PUBLICATIONS

International Search Report issued for PCT/US2008/084434, dated Apr. 15, 2011, 2 pages.
(Continued)

*Primary Examiner* — Benjamin Kurtz
(74) *Attorney, Agent, or Firm* — Norton Rose Fulbright US LLP

(57) ABSTRACT

Porous block nano-fiber composite (110), a filtration system (10) and methods of using the same are disclosed. An exemplary porous block nano-fiber composite (110) includes a porous block (100) having one or more pores (200). The porous block nano-fiber composite (110) also includes a plurality of inorganic nano-fibers (211) formed within at least one of the pores (200).

28 Claims, 16 Drawing Sheets

(51) Int. Cl.
  *B01J 20/28* (2006.01)
  *B01J 20/32* (2006.01)
  *B82Y 30/00* (2011.01)
  *B01D 39/16* (2006.01)
  *B01D 39/18* (2006.01)
  *B01D 39/20* (2006.01)

(52) U.S. Cl.
  CPC . *B01D2239/1233* (2013.01); *B01D 2239/1291* (2013.01); *B01D 2253/104* (2013.01); *B01D 2253/112* (2013.01); *B01D 2257/60* (2013.01); *B01D 2257/91* (2013.01)

(56) References Cited

FOREIGN PATENT DOCUMENTS

| | | |
|---|---|---|
| JP | 11-014204 A | 1/1999 |
| JP | 2003-154223 A | 5/2003 |
| JP | 2006-130463 A | 5/2006 |
| JP | 2006-167695 A | 6/2006 |
| JP | 2006-305422 A | 11/2006 |
| KR | 10-2004-0088046 | 10/2004 |
| KR | 10-0620360 | 9/2006 |
| KR | 10-2007-0012243 | 1/2007 |
| RU | 2242276 | 12/2004 |
| RU | 2317843 C2 | 2/2008 |
| RU | 2328447 C1 | 10/2008 |
| RU | 2336946 | 10/2008 |
| WO | WO-03/000407 A1 | 1/2003 |
| WO | WO-2007/033173 | 3/2007 |

OTHER PUBLICATIONS

Office Action issued for Russian Application No. 2011125334 (037331) dated Feb. 6, 2012, 5 pages and 1 page English translation.
Office Action issued for Japanese Patent Application No. 2011-537406, dated Dec. 24, 2012, 6 pages with English language translation.
Office Action issued for South Korean Patent Application No. 10-2011-7013882, dated Dec. 18, 2012, 12 pages with English language translation.
Official Decision of Grant issued by the Patent Office of the Russian Federation, dated Feb. 22, 2013, 14 pages with English language translation.
The extended European Search Report issued for European Patent Application No. 088878336.0, dated Apr. 3, 2013, 5 pages.
Why Active Carbon Block Water Filter Is Your Best Choice, The Water Page.com, http://www.thewaterpage.com/active-carbon-block.htm, last accessed Jun. 17, 2014, pp. 1-2.
"Glass Microfiber" Lauscha Fiber International; http://www.unifrax.com/web/Audit.nsf/ByUNID;U-805 EN; Rev. Jun. 1, 2014. pp. 1-2.
Examination Report issued for New Zealand Patent Application No. 613256, dated Aug. 25, 2014; pp. 1-3.

* cited by examiner

POROUS BLOCK NANOFIBER COMPOSITE FILTERS

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

CROSS-REFERENCE TO RELATED APPLICATIONS

The present application is a U.S. National State of International Application No. PCT/US2008/084434, filed Nov. 21, 2008, designating the United States, the disclosure of which is incorporated herein by reference.

BACKGROUND

Nano-scale materials of many types are being developed and used for a variety of purposes. Anisotropic nano-scale fibers have been produced having relatively small diameters (e.g., on the order of nano-meters) and much longer lengths, thus making such nano-scale fibers "high aspect ratio" materials. Many of these nano-scale fibers have unique properties that can make them promising candidates for a wide range of applications, as, for example, filtration media.

Processes are available for producing nano-scale alumina particles which can have filtration utility, inter alia. For example, spherical aluminum particles, on the order of about 25 to about 500 nm diametrically with corresponding surface areas of about 10 to about 70 $m^2$/gram, can be solution processed to produce nano-fibers of gamma and/or alpha alumina with favorable surface areas in the range from about 200 $m^2$/gram to as high as about 600 $m^2$/gram, inter alia. In another example, crude boehmite nanofibers can be produced hydrothermally and annealed to give nanofibers with similar properties, the annealing generally causing particles to grow and the surface area to decrease.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements. In view of the foregoing a general aspect of the presently described developments may include providing a porous block nano-fiber composite product including a porous block having one or more pores and a plurality of inorganic nano-fibers formed within at least one of the pores. Non-limiting examples include a carbon porous block and boehmite nano-fibers, inter alia.

Another aspect hereof may include a method for producing a porous block nano-fiber composite, the method including providing a porous block and an aluminum precursor material in water in a process chamber; hydrothermally producing a porous block nano-fiber composite product. The basic fiber created hereby may be boehmite. Other possible precursors may include titanium oxide ($TiO_2$) or iron oxide similarly processed. A further alternative aspect may include annealing, as in annealing boehmite to gamma or alpha alumina depending on temperature. A still further alternative may include incorporating the porous block nano-fiber composite product as an active element as a filtration medium.

In addition to the exemplary aspects and embodiments described above, further aspects and embodiments will become apparent by reference to the drawings and by study of the following descriptions.

BRIEF DESCRIPTION OF DRAWINGS

Exemplary embodiments are illustrated in referenced figures of the drawings. It is intended that the embodiments and figures disclosed herein are to be considered illustrative rather than limiting.

DETAILED DESCRIPTION

Presented here are systems, apparatuses, compositions and/or methods of manufacture or use thereof which involve nano-fiber materials deposited on or formed within the pores of a porous block to provide one or more composite products which can be used as filter media presenting good filtration characteristics. More particularly in some implementations, provided here are non-organic nano-fibers, e.g. of alumina or like substances, including as one specific example, boehmite (Al(O)OH), grown in the pores of a porous filtration block of, in some examples, porous carbon, and processes for the fabrication or use thereof. Exemplary nano-fiber porous block compositions and methods of production and use thereof may be better understood with reference to the Figures and the following description though it should be understood that various alternative porous blocks, non-organic nano-fibers and production methods may be used.

Figure 1:
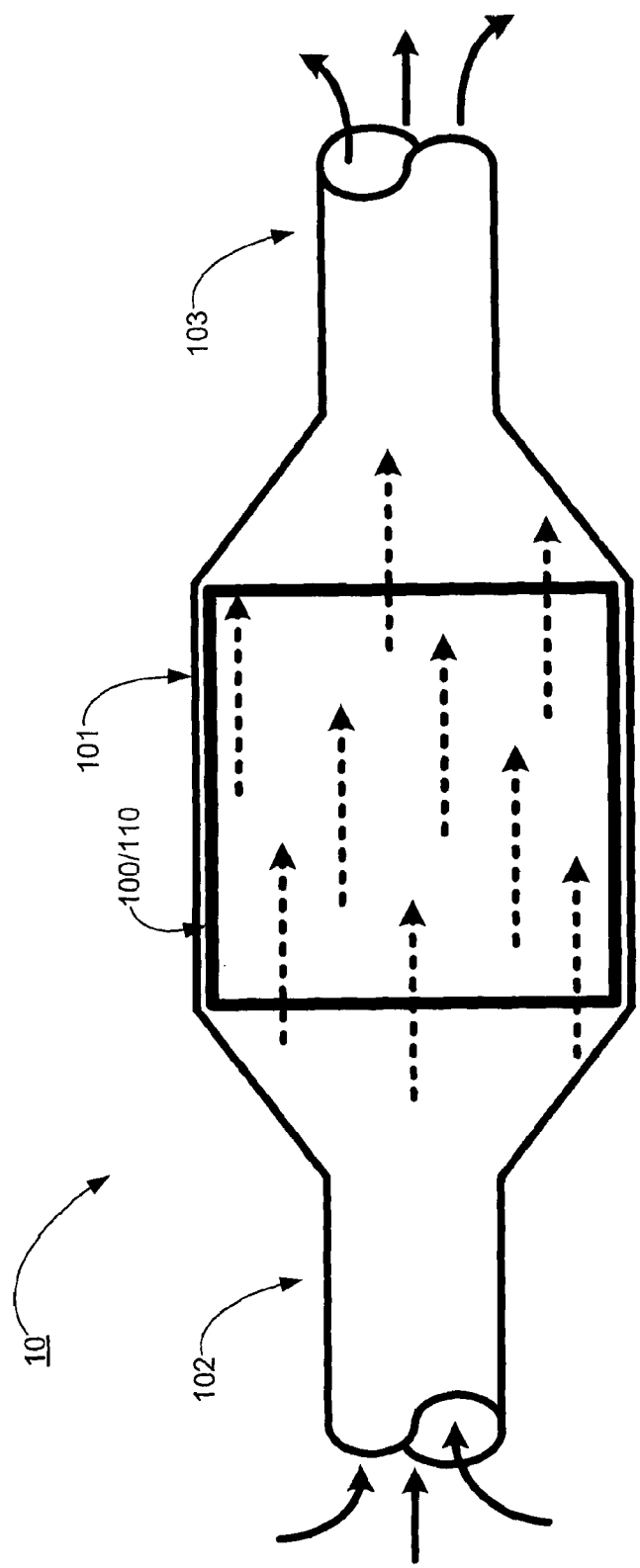
FIG. 1 is a schematic view of an exemplary filter system according to the embodiments described herein.

Referring first to FIG. 1, shown is a generalized depiction of a flow-through filtration system 10 to or for which the developments hereof may be applied or used. More particularly, the filtration system 10 may include a porous filtration block 100 or a modified block 110, modified as described herebelow. Block 100 or 110 may be disposed as shown within a flow-through chamber 101 of system 10. In such a system 10, a fluid may be introduced via an inlet 102 (see e.g., the inlet flow arrows), then flow through the porous filter block 100 or 110 (dashed line flow arrows) and exit via the outlet 103 (outlet flow arrows). In many examples according to the present developments hereof, the fluid is water with one or more contaminants or impurities to be filtered therefrom via the porous filter block 100/110. Note, the block and system are only schematically shown in FIG. 1; a great many potential alternative implementations not constricted by the physical form of FIG. 1 may incorporate one or more features hereof regardless of size, scale, shape, or manner of operation.

Figure 2A:
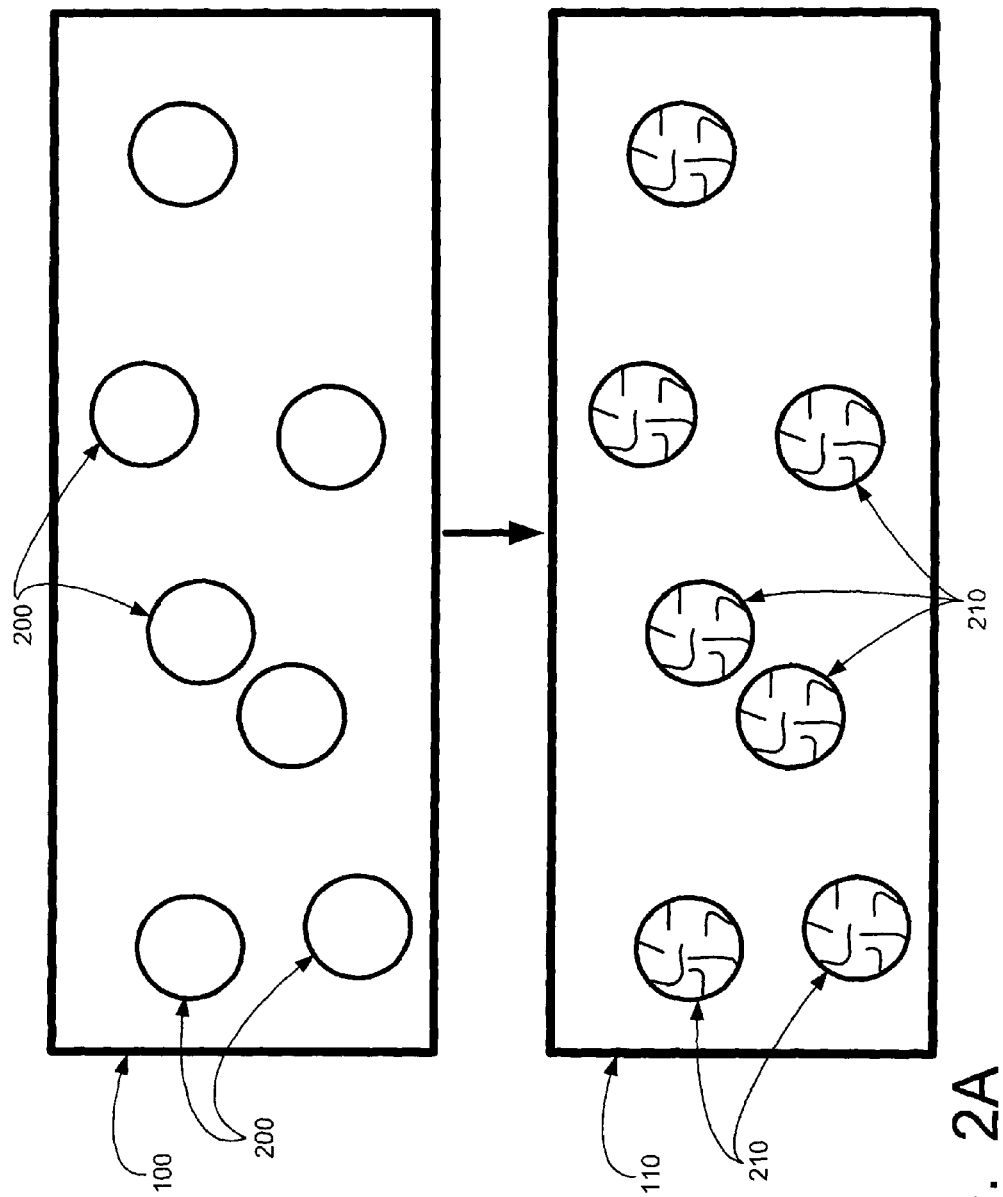
FIGS. 2A and 2B are schematic views of porous blocks highlighting one or more schematically represented pores thereof.
Figure 2B:
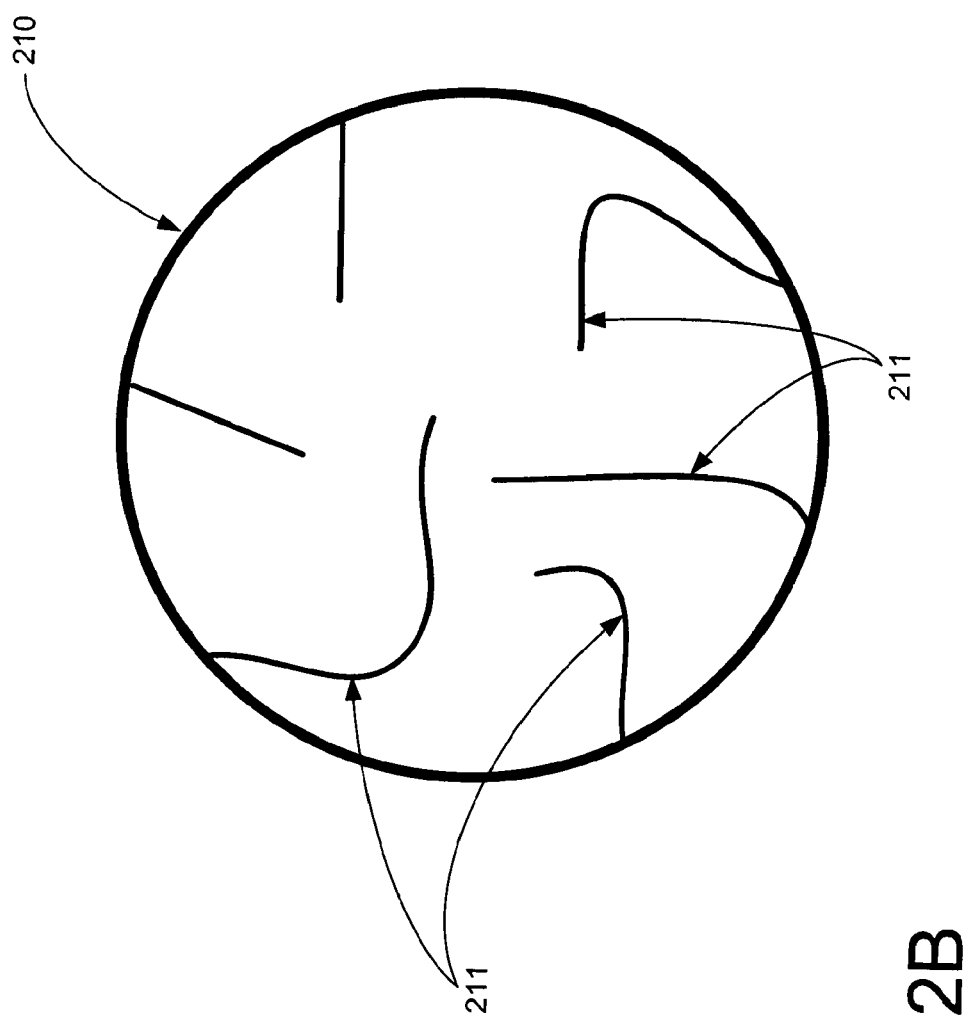
Figure 3:
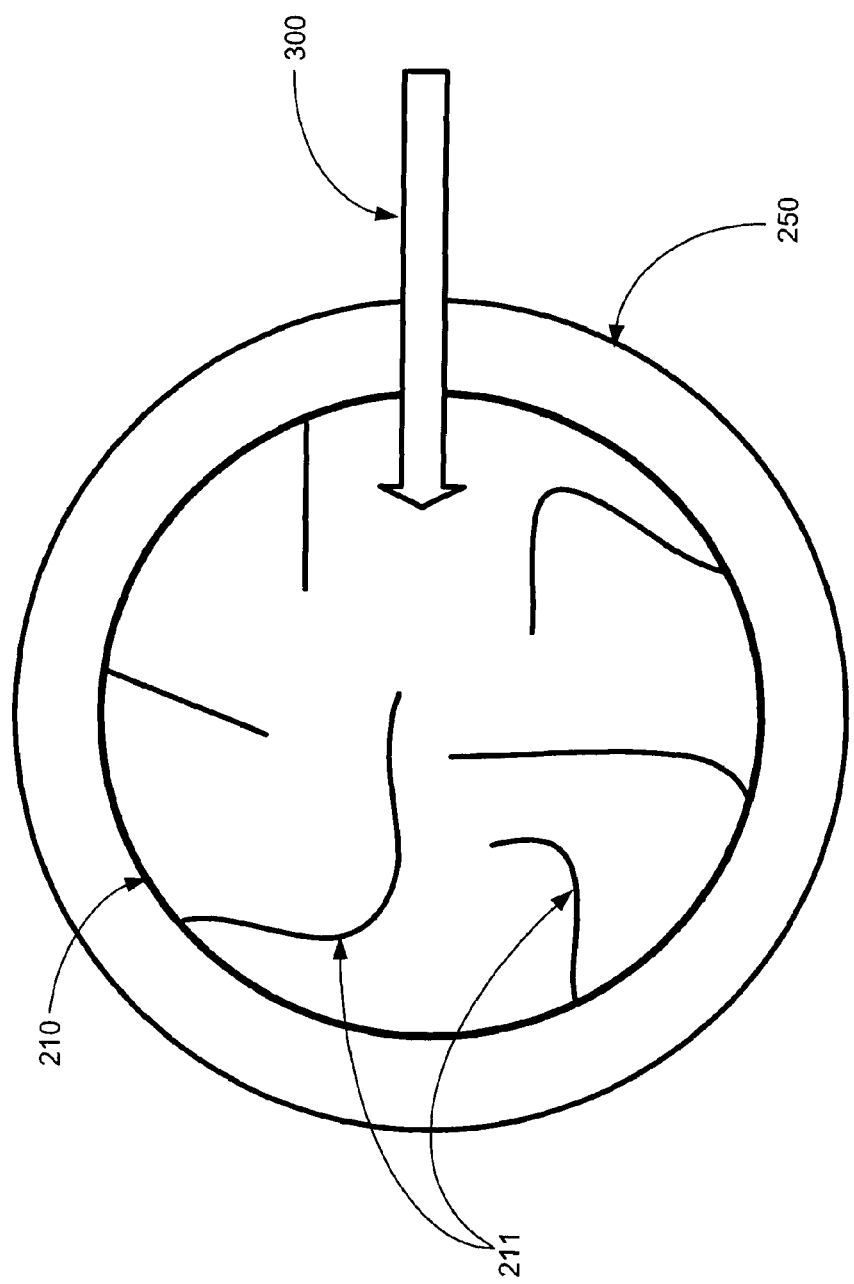
FIG. 3 is a schematic view of a pore of a porous block nano-fiber composite.

FIG. 2 presents a more detailed schematic of a block 100 with a number of pores 200, which, by modification as described herein, and in moving from the upper view to the lower view of FIG. 2A, result in a modified block 110 having modified pore structures 210 which have nano-fibers grown therein or thereon as described below. A magnified view of a schematic pore structure 210 is shown in FIG. 2B with a number of nano-fibers 211 disposed therewithin. FIG. 3 then provides a schematic functional view in which a flow of fluid 300 is shown passing over and into a pore 210 where it contacts one or more nano-fibers 211 as well as the substrate material 250. In examples such as water filtering through a porous carbon block as set forth in more detail below, contact of the water with the carbon can have a beneficial effect as known, with additional benefits provided by the nano-fibers. More specifically, the carbon can remove some contaminants or impurities, e.g., undesirable organics and/or some elements or molecules such as chlorine or chloramines; however, with the addition of the nano-fibers hereof, additional functionality may be found in the further removal of biological pathogens, e.g., viruses or bacteria, or other particulates, organic or inorganic, or toxic elements such as heavy metals.

The external substrate material 250 shown in the example of FIG. 3 may alternatively represent an outer porous membrane with a nano-fiber structure grown in the interior of a pore thereof. Thus, the pore within the porous substrate hereof may be a pore within a porous block or within a porous membrane, or both; however, in either case, the nano-fibers are formed therewithin. An outer porous membrane may also be used with a porous block substrate, so that, for example, such a membrane may serve to contain the nano-fibers 211 and/or any support medium 110 for the nano-fibers. Then, the porous block may then have a first functional attribute as, for example, the carbon described here; with a second attribute in the nano-fibers disposed within the pores of the porous block; and a third attribute in an external outer porous membrane also or alternatively having nano-fibers formed within the pores thereof.

Figure 4:
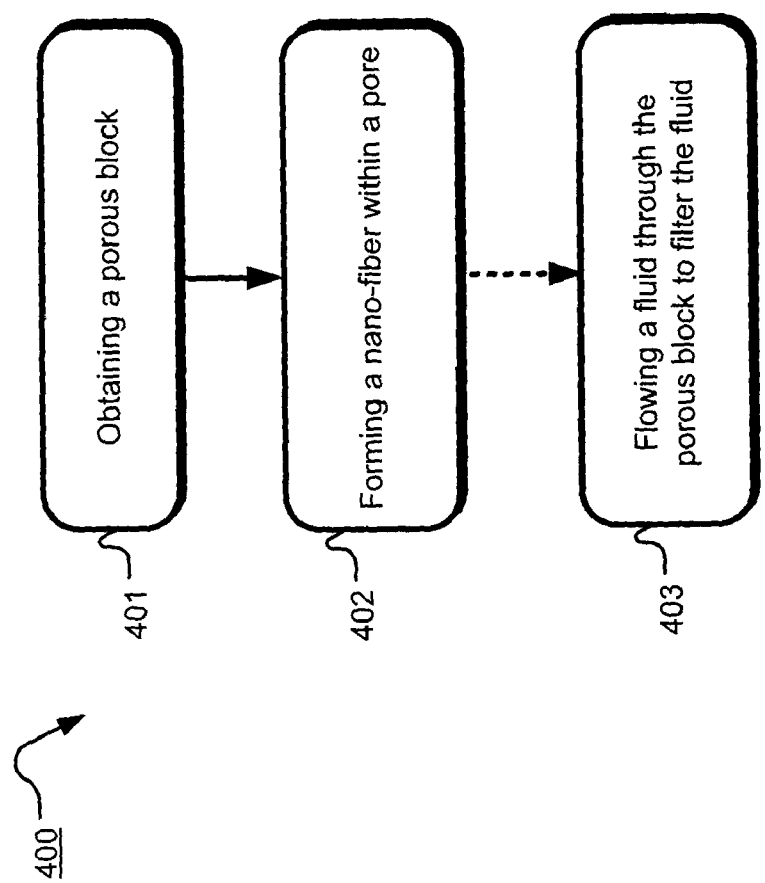
FIG. 4 is a flow chart of a method.

Exemplary porous block nano-fiber composite products may be produced as follows. In one exemplary implementation, the porous block nano-fiber composite 110 may be produced by direct hydrothermal synthesis of nano-fibers 211 in the presence of an as yet un-modified porous block 100. A precursor material may be provided in solution in a suitable reaction vessel (also referred to as a "process chamber") with the porous block 100. The process chamber may then be heated and pressurized to synthesize nano-fibers which form or "grow" on the porous block in the process chamber to produce a porous block nano-fiber composite product 110. FIG. 4 provides a summary view of such a process, here process 400, in which a first step or operation 401 includes obtaining the porous block, the next step or operation 402 involving the formation of the nano-fiber or nano-fibers within at least one pore of the porous substrate.

Direct hydrothermal synthesis of nano-fibers 211 may include providing an aluminum precursor material which may be selected from $Al(OH)_3$, $Al(Ac)_2OH$, and $Al(Ac)(OH)_2$. In an example described further below, boehmite may be the material of the nano-fibers synthesized using an $Al(OH)_3$ pre-cursor with water heated to a temperature of about 200° C. for a time period of about 5 h (five hours) to produce substantially white solid nano-fibers on the porous substrate block on or within one or more pores thereof.

This process is highly reproducible, and the morphology of the resulting product may be particularly advantageous for use as the active element in or directly as filtration media. For example, hydrothermal processing can be used to grow the nano-fibers directly on other porous materials as well to produce enhanced composite filtration media. It is noted that fiber forming reactions which are not necessarily hydrothermal in nature may also be implemented, e.g, where fiber growth can be nucleated in the pores of the base material.

More particularly, the small diameters (average 2 nm) and overall aspect ratio (average 100's of nm) of the nano-fibers and large surface area of the nano-fibers as well as the underlying porous block provide a geometry that is conducive for use in filtration. In addition, the ability of the nano-fibers and the porous block nano-fiber composite to contact a solution, such as water, enables the nano-fibers and the porous block nano-fiber composite to readily act as a filter medium. The nano-fibers and/or the porous block nano-fiber composite collect contaminants or impurities from the fluid flowing in contact therewith to thus provide efficient removal for the filter medium. The flowing of fluid in contact with the porous block and/or nano-fibers is shown as a step or operation 403 in FIG. 4 (though the dashed line connection demonstrates discrete operability thereof relative to the fabrication operations 401 and 402). The nano-fibers do not agglomerate on/within the pores of the porous block and instead promote matrix and scaffolding structures which are more conducive to filtration applications.

The nano-fiber filters may be used for a wide variety of filtration applications. For example, the alumina, and particularly the boehmite-phase, properties of the nano-fibers and the porous block nano-fiber composite aid in the removal of biologicals and heavy metals as described further below. Boehmite has a demonstrated chemical affinity for viruses and heavy metals. The large surface areas of the nano-fibers and the porous block nano-fiber composite may also be well-suited for filtering pathogens.

In other implementations, the porous block nano-fiber composite 110 may be produced by hydrothermal synthesis of nano-fibers 211 in the presence of a porous block 100 with additional and/or alternative elements; for example with active elements, such as $TiO_2$, $Fe_2O_3$, $ZnO$, or other inorganic oxides, etc., embedded in the nano-fiber matrix, or by providing an aluminum precursor material in water with trace amounts of $(NH_4)_2SO_4$. The additional and/or alternative active elements may serve to oxidize or reduce elements to be filtered directly or by photo-oxidation or reduction. Examples of such embodiments are further discussed below.

As introduced for boehmite alumina examples, the aluminum precursor material may be selected from $Al(OH)_3$, $Al(Ac)_2OH$, and $Al(Ac)(OH)_2$, and, although not required, the precursor material may be provided in granular form. The process chamber may be heated for the reaction to take place, typically, heated in the range of about 125° C. to about 200° C. or more, up to e.g., 400° C. for annealing or like processing. The process chamber may also be pressurized, typically, in the range of about 50 psi to about 100 psi (gauge). An exemplary process may produce a porous block nano-fiber composite product, the nano-fiber formation being described by equation (1) according to one implementation in which the precursor material includes $Al(OH)_2Ac$.

$$Al(OH)_2Ac + Water + (NH_4)_2SO_4(trace) = \text{nano-fibers} \quad (1)$$

It may be noted that the balanced chemical reaction is $Al(OH)_2Ac = Al(O)OH + HAc$. Note, with an additional annealing operation (see e.g., below), the boehmite might be made to experience a change in phase from boehmite to gamma alumina. An example of the chemistry is shown in equation (2):

$$AlOOH = \text{gamma-}Al_2O_3 + H_2O \quad (2)$$

And, as may readily be apparent, the process typically may not include the use of salts, making it a "clean" process for producing nano-fibers 211. In addition, the nano-fibers 211 may readily deaggregate from one another, and indeed, may readily be dispersible in a solution (e.g., water), though here are readily nucleated or attached to and/or within the pores of the porous block substrate 100.

It may also be understood that any suitable process chamber may be provided with which the temperature and pressure may be controlled as described herein. According to one implementation, the process chamber may be a Parr Model 4761 300 ml Pressure Reactor or a Parr Model 4642 2 L Pressure Reactor. However, other process chambers now known or later developed are also contemplated as being suitable for use herewith or herein.

The nano-fibers 211 produced according to the hereto may be analyzed using any of a variety of well-known techniques, such as x-ray diffraction. X-ray diffraction (XRD) is commonly used for examining the composition of solids. X-rays are focused on a sample having a repeating atomic structure, which cause the x-rays to scatter or diffract. The scattering x-rays constructively interfere with one another to produce a diffraction beam. The data is typically represented as a series of diffraction patterns, which can be compared to the diffraction patterns of known materials. The alumina nano-fiber products 211 produced according to the methods hereof are about 100% boehmite, as determined by x-ray diffraction. The nano-fiber product 211 may be further processed to the gamma phase of alumina by heating the boehmite to 400° C. in air.

In one implementation, a porous block nano-fiber composite product 110 may be produced during the synthesis of the nano-fibers 211, by providing the as-yet un-modified porous block 100 in the process chamber. Such a process may be described according to one implementation by equation (3), below.

$$Al(OH)_2Ac + Water + (NH4)_2SO_4(trace) + \text{a porous block} \rightarrow \text{composite material} \quad (3)$$

According to this implementation, the nano-fibers 211 are not merely mechanically mixed with a porous block 100. Instead, the porous block 100 serves as a medium on which the nano-fibers 211 "grow" or crystallize during synthesis to produce the nano-fiber composite block 110. Preferably, the nano-fibers 211 bond to the porous block 100 during synthesis without compromising the morphology or reducing the surface area of the nano-fibers 211.

It may further be understood that the a porous block 100 may include any suitable porous material, including for example, carbon, metal oxides, silicones, cellulose and/or organic polymers to name only a few. Production of a substrate porous block 100 is not limited to any particular method and may be produced in any suitable manner, as may be well-understood by those skilled in the art. Note also that no particular size or shape of block or other substrate material is required, merely that the block or substrate material have one or more pores.

Figure 5:
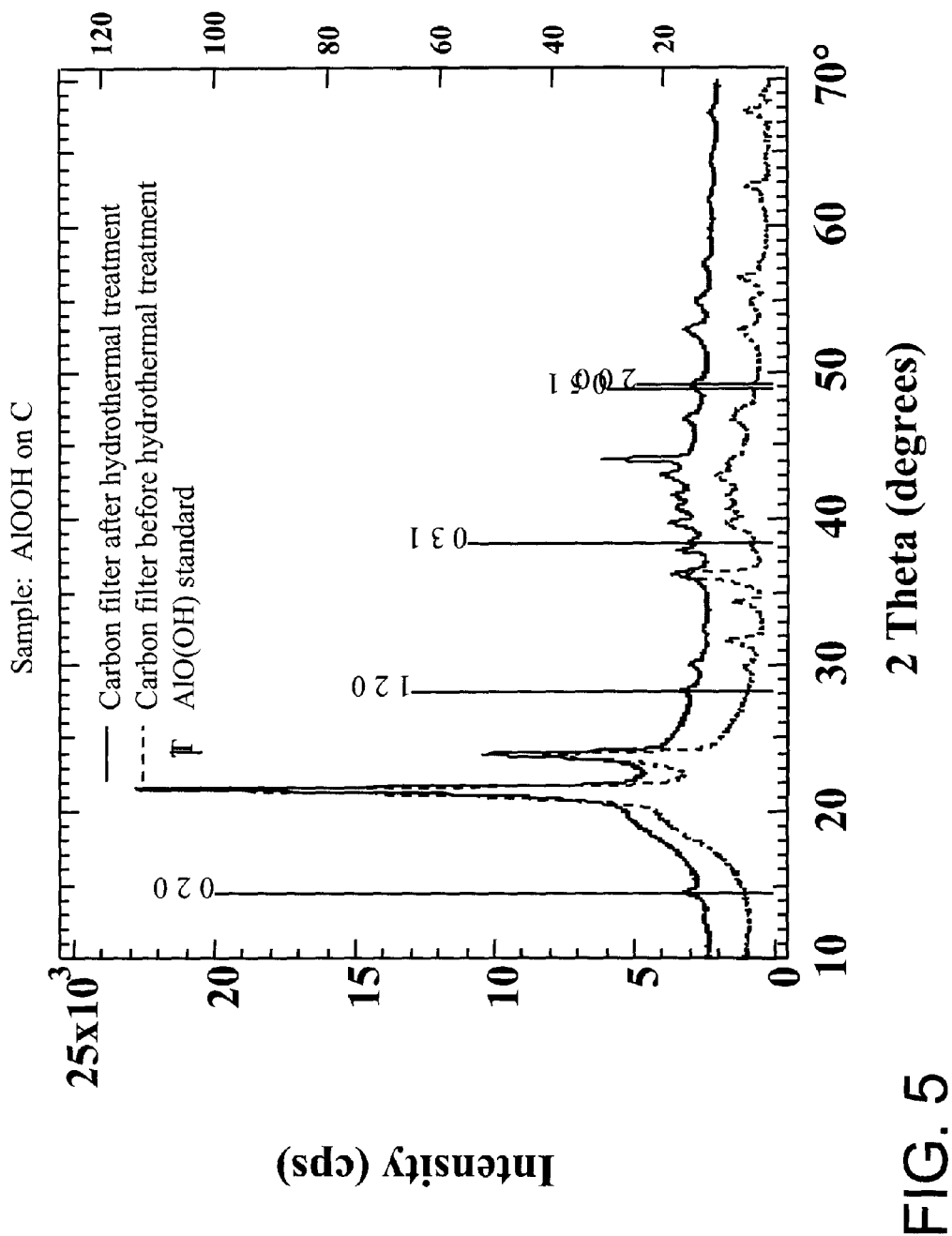
FIG. 5 is an X-ray diffraction (XRD) profile of an example hereof.

A porous block nano-fiber composite product 110 produced according to the teachings hereof may also be analyzed using any of a variety of well-known techniques, such as x-ray diffraction, as briefly discussed above. A composite 110 produced according to the methods hereof may include nano-fibers of about 100% boehmite, as shown in the x-ray diffraction profile of FIG. 5. The nano-fibers of the composite 110 may be further processed to the gamma alumina phase, as discussed above. Following production, the nano-fiber composite 10 may be annealed, annealing to temperatures in the range of about 250° C. to 400° C. to provide the highest nano-fiber product surface area (i.e., about 500-650 $m^2/g$), although it is not intended that the compositions hereof be limited to any particular range of temperatures. Note, this phase change may generally occur without changing morphology or aspect ratio.

Figure 6A:
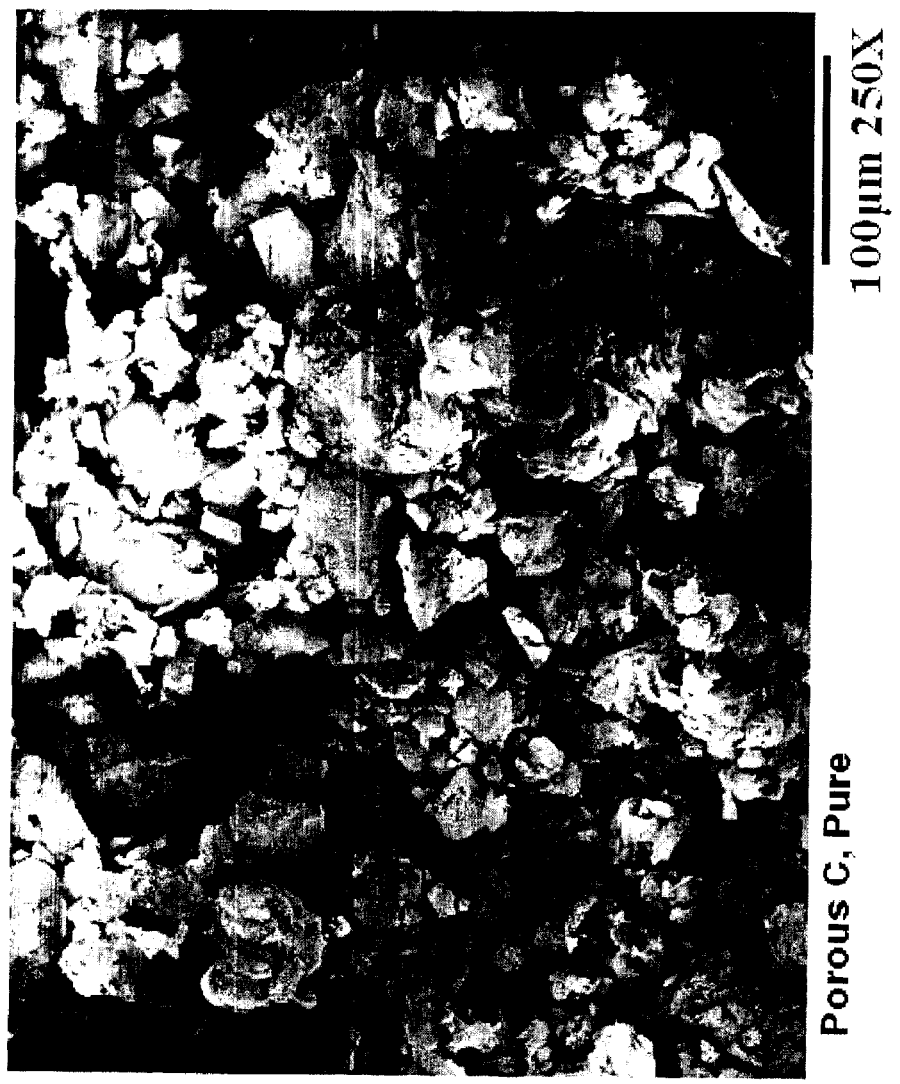
FIG. 6, which includes sub-part FIGS. 6A and 6B, provides scanning electron micrograph (SEM) images of an example hereof.
Figure 6B:
Figure 7A:
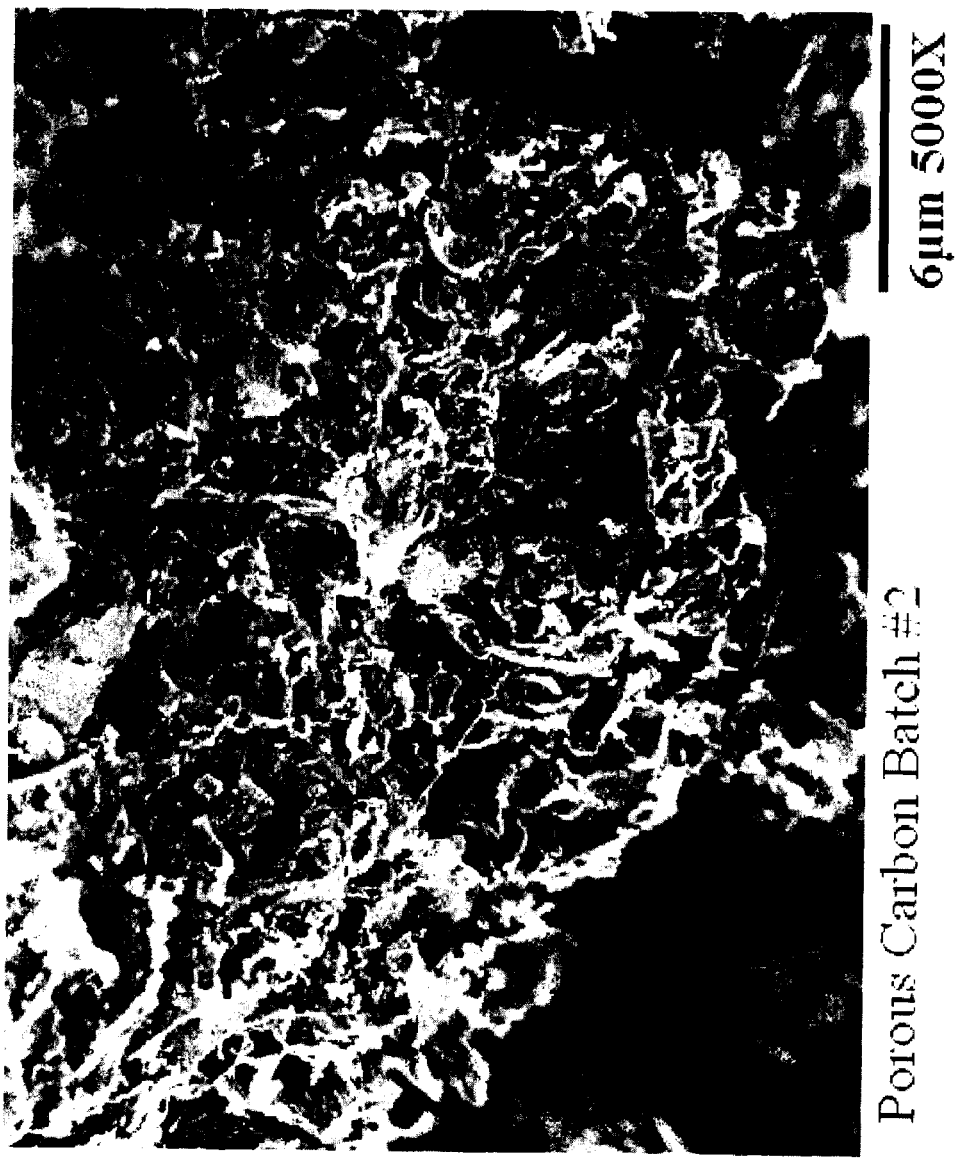
FIG. 7, which includes sub-part FIGS. 7A, 7B and 7C, provides scanning electron micrograph (SEM) images of another example hereof.
Figure 7B:
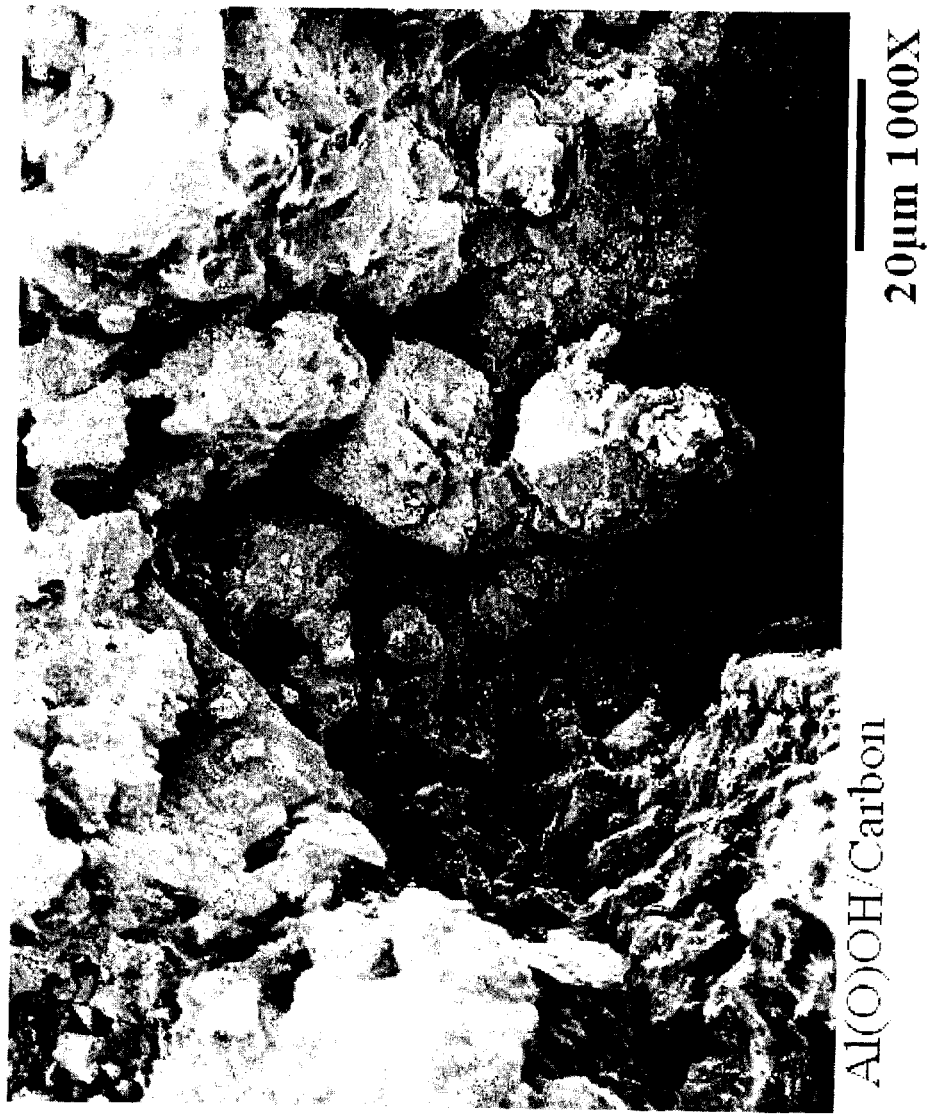
Figure 7C:
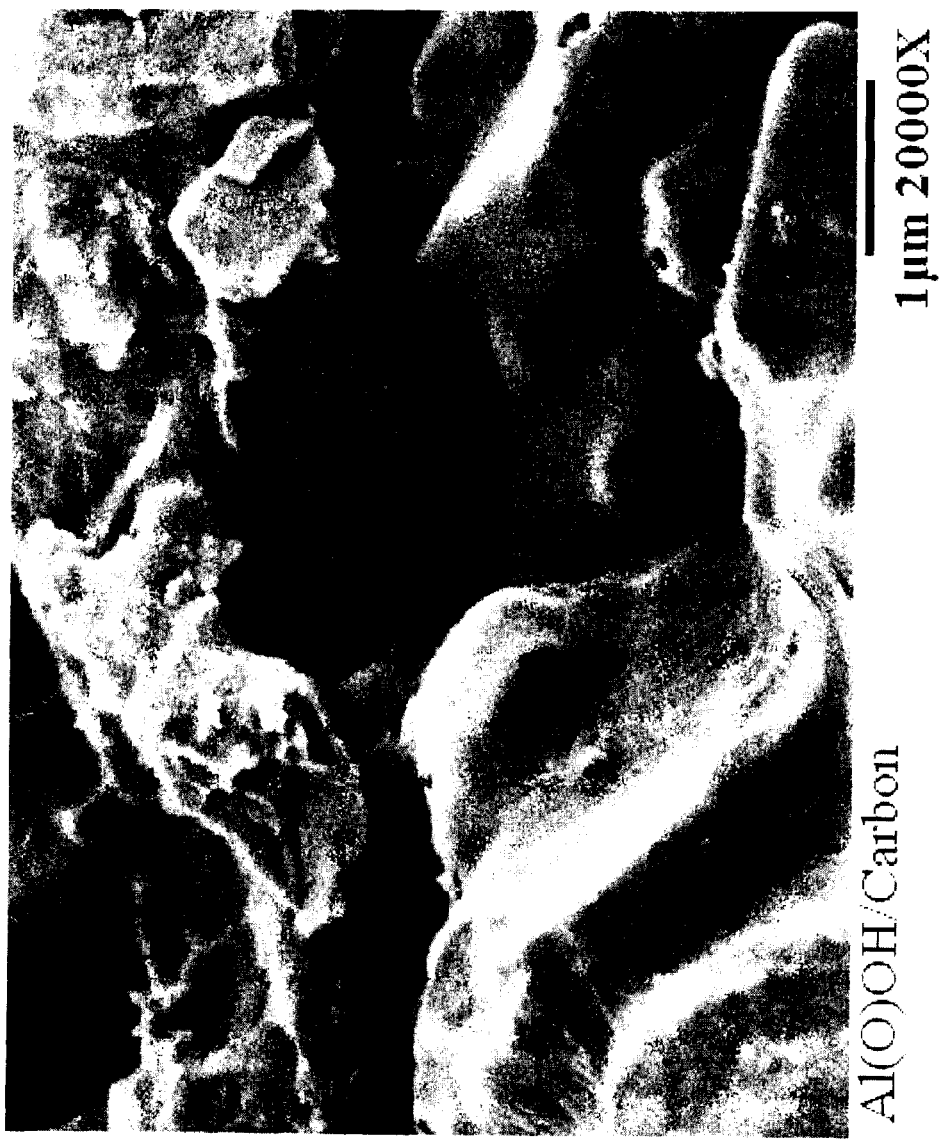

FIGS. 6 and 7 are images of the nano-fiber porous block composite materials produced according to EXAMPLES 1 and 2 below, the images being taken by a scanning electron microscope in a process generically referred to as scanning electron microscopy (SEM). As is readily seen in the SEM images illustrated in FIGS. 6A and 6B, the composite block 110 includes a plurality of nano-fibers crystallized within the pores of a porous carbon block; FIG. 6A being an SEM image of a commercial carbon block before boehmite growth, FIG. 6B being an SEM image of the same commercial carbon block after boehmite growth. Similarly, the SEM images in FIGS. 7A, 7B and 7C show the nano-fiber porous block composite including nano-fibers crystallized on porous carbon blocks having larger pore sizes than the FIG. 6 examples; FIG. 7A being an SEM image of a larger pore commercial carbon block before boehmite growth, FIG. 7B being an SEM image of the same larger pore commercial carbon block after boehmite growth, and FIG. 7C being another SEM image of the same larger pore commercial carbon block after boehmite growth, FIG. 7C being of higher magnification.

Nano-fibers 211 produced according to the teachings hereof include typically very small diameters (e.g., average 2 nm) in relation to their length, giving them high aspect ratios. Accordingly, this unique morphology combined with high surface areas make the nano-fiber porous block composite product 110 conducive for use in many applications, including filtration. In addition, the boehmite phase of the nano-fibers 211 may also enhance the bioactive and heavy metal filtration capability of the product as described further below.

In addition, the nano-fibers 211 and porous block nano-fiber composite 110 can be readily integrated with other materials or devices to produce high-efficiency filtration products. Accordingly, in one implementation the product 110 may be readily incorporated as filter media within a filtration system, such as the system 10 of FIG. 1. The nano-fibers 211 and/or nano-fiber composite 110 provide desirable removal characteristics for the filter media.

The unique morphology and other characteristics of the nano-fibers 211 and/or porous block nano-fiber composite 110 make the products hereof particularly suitable for a potential large range of filtration applications including, but not limited to, both air filters and water filters. The boehmite phase also lends itself due to chemical affinity, to use in bioactive applications. These products provide a chemical and/or electrostatic affinity and/or high surface area to which viruses and pathogens may adhere, making these products particularly advantageous in bioactive filtration applications. An exemplary of bio-affinity of boehmite fibers is shown by the product characteristics in Table 1 (noting these characteristics were generated for boehmite nano-fibers grown by processes like those described herein though not on/in carbon block substrate pores such as those of EXAMPLES 1 and 2), below.

TABLE 1

| | |
|---|---|
| Virus rating | >log 7 |
| Space Flow Velocity (cm/sec) | 1.6 |
| Capacity to Absorb Virus-size Particles (units/cm$^2$) | $1.2 \times 10^{13}$ (before penetration) |
| Susceptibility to Clogging | low |
| Susceptibility to Point Defects | no |

Initial studies were conducted using other filter substrates including 20-70 wt % boehmite nano-fibers and ranging from about 1.0 mm to 1.5 mm thick. Bacterial viruses (bacteriophase) PRD-1 and MS-2 (surrogates for human viruses) were used to study the attenuation of viruses by such filters. Removal efficiencies were greater than 99.9999%.

The unique morphology and other characteristics of such nano-fibers 211 as these may be used within a porous block nano-fiber composite product 110 also makes such products hereof particularly suitable for filtering heavy metals via metal ion chemisorption. Boehmite nano-fibers formed by processes not unlike those described herein and used in heavy metal filtering may include a boehmite mat supported on a Gelman Acrodisc syringe filter prepared by dispersing 0.1 g of such boehmite nano-fibers in water (10 ml) and passing the dispersion through the filter. Such a heavy metal filter was tested for its ability to remove the following heavy metals: zinc (Zn), cadmium (Cd), lead (Pb), copper (Cu), gold (Au), and silver (Ag) from water. The results of the tests are shown in Table 2, below.

TABLE 2

| | Zn | Cd | Pb | Cu | Au | Ag |
|---|---|---|---|---|---|---|
| Metal in untreated water (mg/L) | 50 | 35 | 35 | 35 | 1 | 1 |
| Metal in treated water (mg/L) | 0.001 | 0.001 | 0.001 | 0.001 | 0.001 | 0.001 |
| Removal Efficiency (%) | 99.998 | 99.997 | 99.997 | 99.997 | 99.9 | 99.9 |

These test results demonstrate the potential application of boehmite nano-fibers produced according to the methods hereof for use on/in porous block nano-fiber composite products 110 in or as heavy-metal filters, such filters being usable for drinking water treatment and industrial waste water treatment, among other applications.

Thus, the nano-fiber filter block 110 may be used for biological and/or inorganic filtering applications by mechanical and/or chemical adsorption and/or electrostatic attraction mechanisms. A nano-fiber filter 110 represents a complex composite structure which may be optimized for absorption of specific materials. In addition, nano-fiber filter 110 may be used under high flow conditions. In another embodiment, the adsorbed materials may be eluted from the filter.

Note the base filter material, here for example, the porous block, may thus be enhanced in the composite filter product form; in a particular example, the standard porous block being effective for filtration of large bacteria like *e-coli* and *cryptosporidium* (e.g., *cryptosporidium* organisms (protozoa) form protective oocysts between 4 to 7 microns in size; giardia are also in the form of oocysts but slightly larger, between 6 to 10 microns in size; these oocysts allowing the organisms to survive outside the body of the host, in a watercourse, and protects them against disinfection methods such as chlorination or ultra-violet radiation). However, the actual non-oocyst bacteria are much smaller, e.g., about 0.2-0.5 microns, and the presently described nanofibers reduce the effective pore size of the substrate to much smaller and add chemical activity to capture not only the oocysts capable of being trapped by conventional porous blocks, but, to also capture the bacterial organisms, themselves, as well as much smaller viruses and chemical contaminants.

The products hereof are not limited to bioactive and/or heavy metal water filtration applications. In another implementation, a product hereof may be used in filters for removing ultra small particles released from solvents such as alcohols, esters, and ketones. In other implementations, a product hereof may be used for the filtration of high-purity chemicals or water used in electronics manufacturing. A further new application may be in the filtering out of nanomaterials, whether inorganic, organic or otherwise (as there is increasing concern about the toxicity of nanomaterials; as per DOE P 456.1, U.S. Department of Energy, Publication 456.1). Other exemplary applications may include air or other gas filters. Yet other filtration applications are also contemplated as being within the scope hereof, as will become readily apparent to one skilled in the art after having become familiar with the teachings hereof.

Among the still other applications intended to be within the scope of the present compositions are, for example, the nano-fibers 211 and/or composite blocks 110 produced according to the processes described herein which may be used with absorption pads (e.g., for medical detection kits), and concentration/scavenging of biological agents (including bioterrorism weapons), to name just a few.

Example 1

In this example, the precursor material included laboratory grade granular Al(OH)$_3$ of a type that is readily commercially available from a wide range of suppliers. In this example, boehmite nano-fibers were synthesized using about 25.5 g Al(OH)$_3$ with about 200 ml water heated to a temperature of about 200° C. for a time period of about 5 h (five hours) to produce substantially white solid nano-fibers on a commercially available porous carbon substrate block on or within one or more pores thereof; the carbon substrate blocks here, being 4 carbon rings, 1.5 inch diameter×0.5 inch thick (note, as introduced above, the term porous block is not shape dependent). The process chamber was maintained at a total pressure of about 150 psi (gauge). The process chamber was maintained at about 200° C. and the reaction temperature was estimated to be about 180° C. The reaction resulted in the production of about 19.0 g of nano-fibers. The product was dried at about 100° C. for 5 hours.

The nano-fibers produced according to this example were analyzed using x-ray diffraction techniques, briefly described above and shown in FIG. 5. The nano-fibers included about 100% boehmite and had an average surface area of about 285 m$^2$/g by BET analysis. The nano-fibers were also confined to the porous carbon block, thereby enabling ready subsequent use in filtration, such as was described above. As introduced above, SEM images of before and after processing for this example are shown in respective FIGS. 6A and 6B.

Example 2

In this example, the precursor material included substantially the same laboratory grade Al(OH)₃ of a type that is readily commercially available from a wide range of suppliers. In this example, the boehmite nano-fibers were again synthesized using about 25.5 g Al(OH)₃ with about 200 ml water heated to a temperature of about 200° C. for a time period of about 5 h (five hours) to produce substantially white solid nano-fibers on a commercially porous carbon substrate on or within one or more pores thereof. The porous block material hereof included carbon base materials (here, also four (4) carbon rings, 1.5 inch diameter×0.5 inch thick) with larger pore structures than the substrates of Example 1, see FIGS. 7A, 7B and 7C.

The process chamber was maintained at a total pressure of about 150 psi. The process chamber was maintained at about 200° C. and the reaction temperature was estimated to be about 180° C. The reaction was allowed to proceed in this manner for about 5 hours, which resulted in the production of about 19 g of nano-fiber porous block composite material. The composite product was dried at about 100° C. for 5 hours.

The nano-fiber composite produced according to this example was analyzed using x-ray diffraction techniques, briefly described above. The nano-fiber composite included about 100% boehmite. The nano-fiber porous block composite had an average surface area of about 195 m²/g determined by BET analysis.

It is noted that the Examples 1 and 2 discussed above are provided for purposes of illustration and are not intended to be limiting. Still other implementations and modifications are also contemplated.

As introduced above, one of a variety of alternative precursors may be titanium oxide (TiO₂). A form of titanium oxide chemistry involves hydrothermal digestion of TiO₂ powder in strongly basic solution to produce sodium titanate nanotubes, as shown.

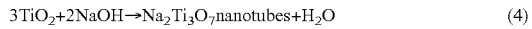

$$3TiO_2 + 2NaOH \rightarrow Na_2Ti_3O_7 \text{ nanotubes} + H_2O \qquad (4)$$

Example 3

Figure 8:
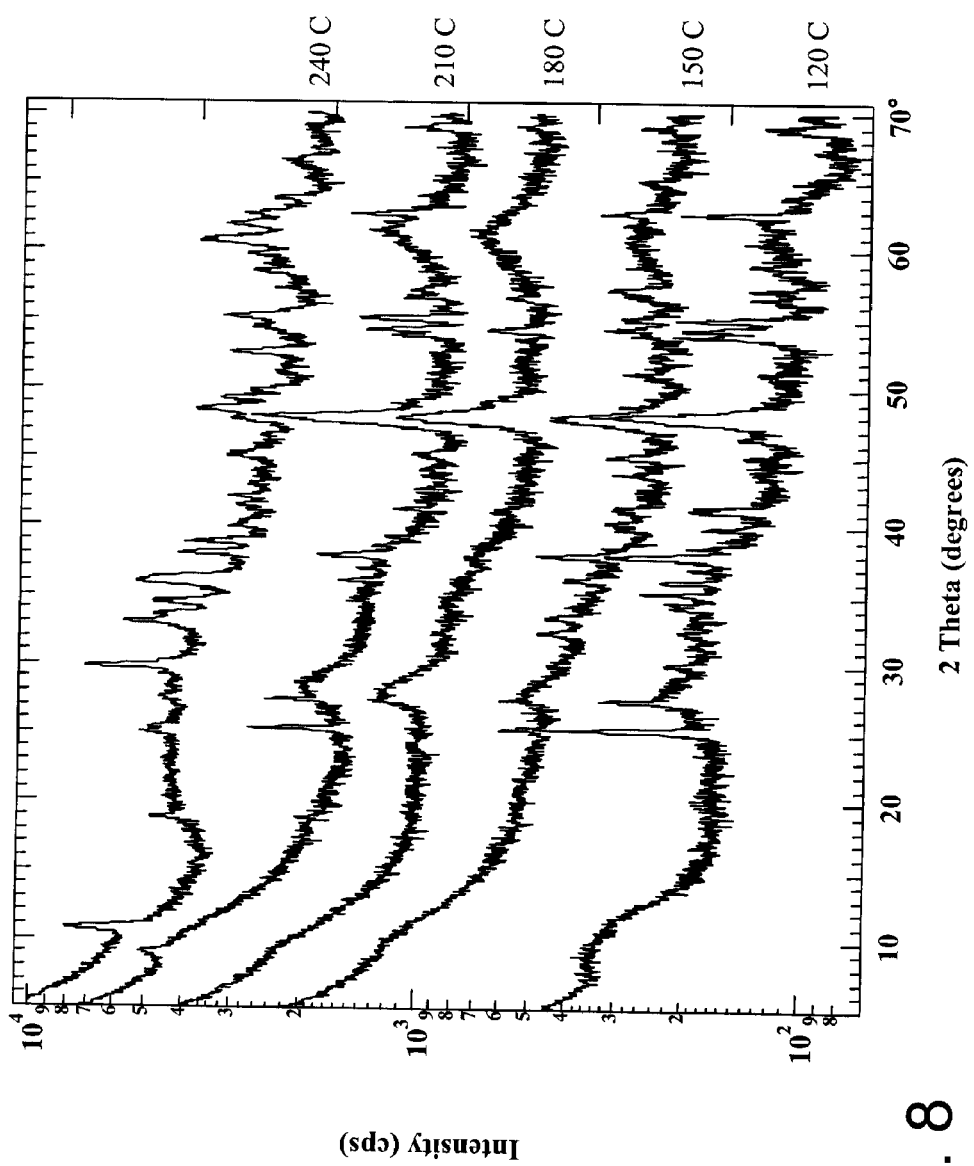
FIG. 8 is an X-ray diffraction (XRD) characterization of a further example hereof.
Figure 9B:
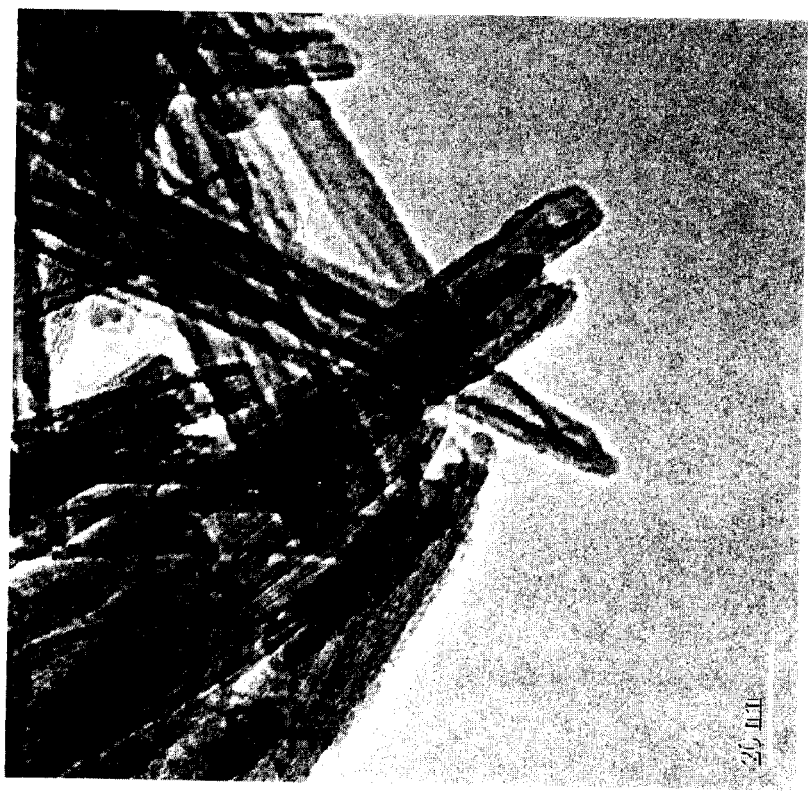
FIG. 9, which includes sub-part FIGS. 9A and 9B, provides transmission electron microscopy (TEM) images of still further examples hereof.
Figure 9A:
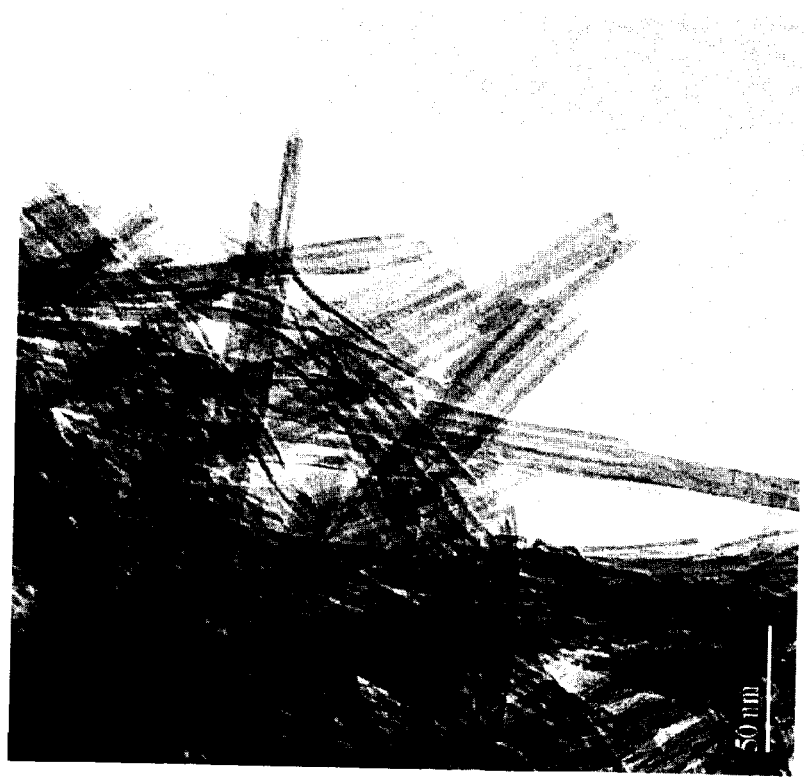

In an example preparation, 5.0 g of TiO₂ powder was mixed with 50 ml of 10 N NaOH in a Teflon beaker and placed in a 300 ml Parr pressure reactor. The reactor was heated at 180° C. for 5 hrs and cooled to room temperature. The contents were filtered, washed with 100 ml of water and dried at 100° C. for 30 min to give a white powder characterized as sodium titanate nanotubes by XRD as shown in FIG. 8, and transmission electron microscopy (TEM) as shown in FIG. 9. More particularly, FIG. 8 is an X-ray diffraction (XRD) characterization of titanate products synthesized at various temperatures as shown therein. The trace for the material synthesized at 180° C. corresponds to phase pure Na₂Ti₃O₇ nanotubes. FIG. 9, in respective sub-part FIGS. 9A and 9B, provides (TEM) images of titanate nanotubes synthesized at 180 C.

Figure 10:
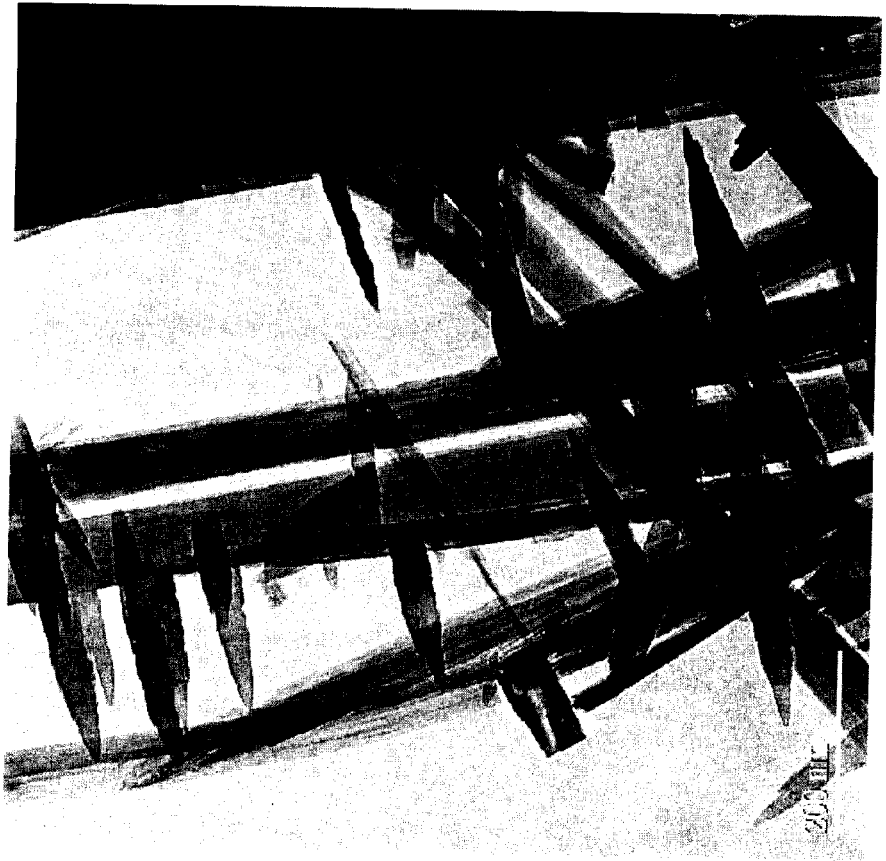
FIG. 10 provides a still further transmission electron microscopy (TEM) image of a still further example hereof.
Figure 11:
FIG. 11 provides yet another transmission electron microscopy (TEM) images of yet another example hereof; and, FIG. 12 provides X-ray diffraction (XRD) scans of titanate nanotubes and anatase $TiO2$ nanorods.

When the titanate nanotubes are subsequently heated in water at temperatures between about 150 and about 250° C. for 3 to 24 hrs, the material is converted into anatase TiO₂ nanorods. In the following examples 0.5 g of sodium titanate nanotubes were placed in 25 ml of water in a Teflon-lined 300 ml Parr pressure reactor, which was then maintained at the specified temperature for the specified time. The products were collected, washed with water (100 ml), dried at 100° C. for 30 min and characterized by XRD and TEM as shown in FIGS. 10 and 11. In FIG. 10, shown are products of hydrothermal conversion of titanate nanotubes to TiO₂ nanorods processed at 150° C. for 24 hrs showing intermediate conversion of titanate belts to TiO₂ spikes. In FIG. 11, shown are products of hydrothermal conversion of titanate nanotubes to TiO₂ nanorods processed at 230° C. for 5 hrs showing complete conversion to TiO₂ nanorods.

Figure 12:
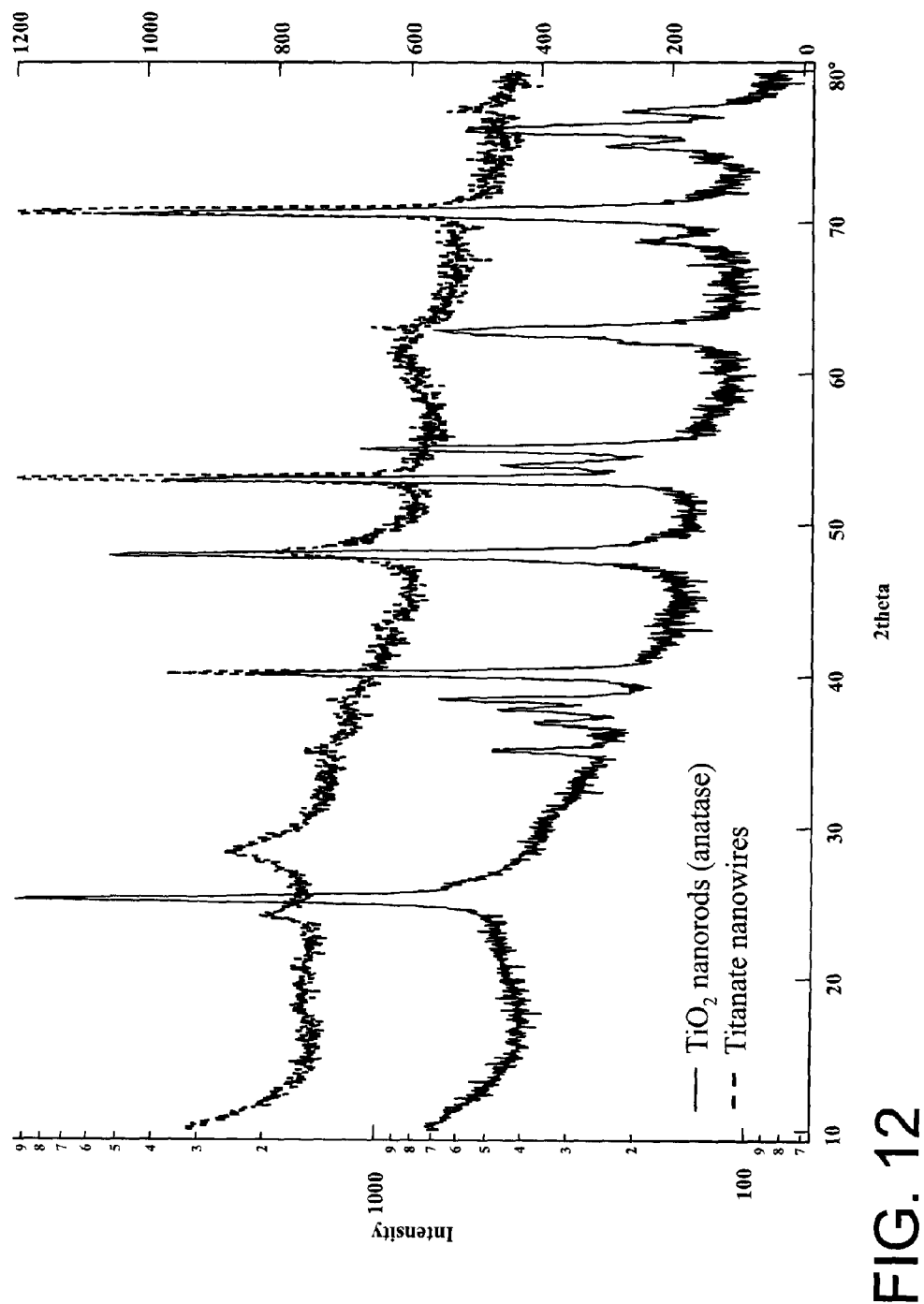

The hydrothermal conversion of the titanate nanotubes to TiO₂ can be controlled using reaction time and temperature to produce different product morphologies, as illustrated by the two TEM images described above (FIGS. 10 and 11). XRD as shown in FIG. 12 confirms that the TiO₂ produced is the crystalline anatase phase.

It is noted that the titanium oxide examples of Example 3 discussed above are provided for purposes of illustration and are not intended to be limiting. Still other implementations and modifications are also contemplated.

The carbon materials used herein may be derived from any of a number of sources, including but not limited to bituminous coal, wood or coconut shell, inter alia. In some instances, a powder form of carbon may be formed into a porous block using a binder to create the particular size and/or shape desired, and the binder then burned out. Other block formation techniques may be used as well or in lieu hereof, as for example compression molding.

Note, the block and system are only schematically shown in FIG. 1; a great many potential alternatives may incorporate the features hereof regardless of size, scale, shape, or manner of operation. Blocks hereof need not be polygonal, but may take many shapes depending upon end use. End uses may be personal water bottle size blocks, or may be of larger scales up to and/or including transportable systems, e.g., transportable by truck or aircraft, up to and/or including municipal size implementations.

It is noted that the examples discussed above are provided for purposes of illustration and is not intended to be limiting. Still other embodiments and modifications are also contemplated.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:
1. A filtration system comprising:
   a flow-through chamber having an inlet and an outlet; and
   a porous block nano-fiber composite filtration medium disposed within the flow-through chamber, the filtration medium comprising:
      a porous carbon block formed from porous carbon and having one or more pores; and
      a plurality of inorganic nano-fibers formed within at least one of the pores of the porous carbon block.
2. The filtration system of claim 1 wherein the inorganic nano-fibers are formed from at least one of: an aluminate, titanate, or inorganic oxide.
3. The filtration system of claim 1 wherein the inorganic nano-fibers are at least one of: boehmite, gamma alumina, or alpha alumina.
4. The filtration system of claim 1 wherein the inorganic nano-fibers are formed using a precursor material which includes at least one of the following: TiO₂, Al(OH)₃, Al(Ac)₂OH, or Al(Ac)(OH)₂.

5. The filtration system of claim 1 wherein the inorganic nano-fibers are formed using a hydrothermal process.

6. The filtration system of claim 1 used for absorption of at least one of biologicals or pathogens.

7. A porous block nano-fiber composite comprising:
   a porous carbon block formed from porous carbon and having one or more pores; and
   a plurality of inorganic nano-fibers formed within at least one of the pores of the porous carbon block.

8. The porous block nano-fiber composite of claim 7 wherein the inorganic nano-fibers are formed from at least one of: an aluminate, titanate, or inorganic oxide.

9. The porous block nano-fiber composite of claim 7 wherein the inorganic nano-fibers are at least one of: boehmite, gamma alumina, or alpha alumina.

10. The porous block nano-fiber composite of claim 7 wherein the inorganic nano-fibers are formed using a precursor material which includes at least one of the following: $TiO_2$, $Al(OH)_3$, $Al(Ac)_2OH$, or $Al(Ac)(OH)_2$.

11. The porous block nano-fiber composite of claim 7 wherein the inorganic nano-fibers are formed using a hydrothermal process.

12. The porous block nano-fiber composite of claim 7 adapted for use as a filter for absorption of at least one of biologicals or pathogens.

13. The porous block nano-fiber composite of claim 7 adapted for use as a filter for absorption of at least one heavy metal.

14. The porous block nano-fiber composite of claim 7 wherein the inorganic nano-fibers are formed using a hydrothermal process comprising:
   providing an un-modified porous carbon block and an inorganic precursor material in water in a process chamber;
   heating and pressurizing the process chamber to produce a porous block nano-fiber composite product; and
   incorporating the porous block nano-fiber composite product as an active element of a filtration medium.

15. A method for producing a porous block nano-fiber composite, comprising:
   providing a porous carbon block and an inorganic precursor material in water in a process chamber; and
   hydrothermally producing a porous carbon block nano-fiber composite product, wherein the hydrothermally producing comprises synthesizing inorganic nano-fibers within pores of the porous carbon block.

16. The method of claim 15 further including incorporating the porous carbon block nano-fiber composite product as an active element of a filtration medium.

17. The method of claim 15 wherein the hydrothermally producing includes at least one of heating or pressurizing.

18. The method of claim 15 wherein the inorganic nano-fibers are formed from at least one of: an aluminate, titanate, or inorganic oxide.

19. The method of claim 15 wherein the inorganic nano-fibers are at least one of: boehmite, gamma alumina, or alpha alumina.

20. The method of claim 15 wherein the inorganic precursor material is at least one of the following: $TiO_2$, $Al(OH)_3$, $Al(Ac)_2OH$, or $Al(Ac)(OH)_2$.

21. The method of claim 15 wherein the process chamber is heated to a temperature in a range of 125° C. to 200° C.

22. The method of claim 15 wherein the process chamber is pressurized to a pressure in a range of 50 psi to 100 psi.

23. The method of claim 15 wherein the inorganic nano-fibers have a dry surface area of 200 $m^2$/g to 300 $m^2$/g.

24. The method of claim 15 wherein the inorganic nano-fibers are 100% boehmite according to x-ray diffraction analysis.

25. The method of claim 15 wherein the porous carbon block nano-fiber composite product is produced in the process chamber after a period of at least 5 hours.

26. A porous carbon block nano-fiber composite filter for biological or inorganic filter applications produced according to the process of claim 15.

27. The porous carbon block nano-fiber composite filter of claim 26 adapted for absorption of at least one of biologicals or pathogens.

28. The porous carbon block nano-fiber composite filter of claim 26 adapted for absorption of at least one heavy metal.

* * * * *